United States Patent

Murayama et al.

[11] Patent Number: 6,010,773
[45] Date of Patent: *Jan. 4, 2000

[54] MAGNETIC RECORDING MEDIUM

[75] Inventors: Yuichiro Murayama; Katsuhiko Meguro, both of Odawara; Masaki Satake, Fujinomiya; Hiroshi Hashimoto, Odawara, all of Japan

[73] Assignee: Fuji Photo Film Co., Ltd., Kanagawa, Japan

[*] Notice: This patent is subject to a terminal disclaimer.

[21] Appl. No.: 08/978,416

[22] Filed: Nov. 25, 1997

[30] Foreign Application Priority Data

Nov. 25, 1996 [JP] Japan .................................. 8-313483
Nov. 21, 1997 [JP] Japan .................................. 9-321291

[51] Int. Cl.$^7$ .................................................. G11B 5/702
[52] U.S. Cl. ...................... 428/216; 428/336; 428/425.9; 428/694 BU; 428/694 BL; 428/694 BS; 428/900
[58] Field of Search .......................... 428/425.9, 694 BU, 428/694 BL, 694 BS, 900, 336, 216

[56] References Cited

U.S. PATENT DOCUMENTS 5,747,157  5/1998  Hashimoto et al. .................... 428/332

Primary Examiner—Stevan A. Resan
Attorney, Agent, or Firm—Sughrue, Mion, Zinn, Macpeak & Seas, PLLC

[57] ABSTRACT

The present invention provides a magnetic recording medium having good electromagnetic transfer characteristics and high running durability, and it comprises a lower layer and a magnetic layer, said lower layer having at least one of magnetic powder or non-magnetic inorganic powder and a binder (A) dispersed therein and being placed on a non-magnetic support member, at least one layer of said magnetic layers having ferromagnetic powder and a binder (B) dispersed therein and being deposited on said lower layer, whereby said magnetic recording medium comprises polyurethane resins (1) and (2), said polyurethane resin (1) is contained as said binder (B) and comprises a short-chain diol having a cyclic structure and weight average molecular weight of 200 to 500 in an amount of 15 to 50 weight %, a polyol having an ether group of 1 to 6 mmol/g and weight average molecular weight of 500 to 5000 in an amount of 10 to 50 weight % in polyurethane, and an organic diisocyanate, and said polyurethane resin (2) is contained as said binder (A) and comprises a short-chain diol having cyclic structure and weight average molecular weight of 200 to 500 in an amount of 0 to 15 weight %, a polyol having an ether group of 6 to 14 mmol/g and weight average molecular weight of 500 to 5000 in an amount of 50 to 90 weight %, and an organic diisocyanate.

4 Claims, No Drawings

MAGNETIC RECORDING MEDIUM

BACKGROUND OF THE INVENTION

The present invention relates to a magnetic recording medium, which comprises a lower layer and one or more magnetic layers, said lower layer having at least one of magnetic powder or non-magnetic powder and a binder dispersed therein and being disposed on a non-magnetic support member, said magnetic layer having ferromagnetic powder and a binder dispersed therein, and said medium having good electromagnetic transfer characteristics and high durability.

The magnetic recording medium is widely used in such applications as tape for recording, video tape or floppy disk. In a magnetic recording medium, a magnetic layer having ferromagnetic powder dispersed in a binder is laminated on a non-magnetic support member.

The magnetic recording medium must be at high level in properties such as electromagnetic transfer characteristics, running durability, and running performance. Specifically, an audio tape for recording and reproducing musical sound must have high ability to reproduce the original sound. A video tape must have good electromagnetic transfer characteristics such as high ability to reproduce original picture.

In addition to good electromagnetic transfer characteristics as described, the magnetic recording medium must have high running durability as described above. In order to provide good running durability, abrasive material and lubricant are generally added to the magnetic layer.

However, to provide high running durability, the quantity of the abrasive to be added must be increased, and this means decrease of filling degree of the ferromagnetic powder. In case an abrasive material having larger particle size is used to ensure good running durability, the abrasive material tends to protrude on the surface of the magnetic layer. Therefore, improvement of the running durability using the abrasive material often leads to deterioration of the electromagnetic transfer characteristics as described above.

When it is attempted to improve the running durability using a lubricant, the quantity of the lubricant to be added must be increased. As a result, the binder is very likely to be plasticized, and the durability of the magnetic layer tends to decrease.

In the improvement of the durability and the electromagnetic transfer characteristics, the binder, serving as one of major components of the magnetic layer, plays an important role. Vinyl chloride resin, cellulose resin, urethane resin, acrylic resin, etc. used for this purpose in the past have problems in that abrasion resistance of the magnetic layer is deteriorated and running components of the magnetic tape are contaminated.

Contamination of magnetic head causes deterioration of electromagnetic transfer characteristics. In particular, in equipment and devices used for high density recording, number of revolutions of the magnetic head is increased. The number of revolutions of the magnetic head is 9,600 rpm in digital video tape recorder, and this is far higher than 1,800 rpm in analog video tape recorder for home use and 5,000 rpm in video tape recorder for business use. As a result, sliding speed between the magnetic recording medium and the magnetic head increases. Also, small size magnetic head such as thin film head is now used. In this respect, there are now strong demands on improvement or elimination of contamination of the magnetic head caused by the substances generated from the magnetic recording medium.

To solve the above problems, several methods have been proposed to increase hardness of the magnetic layer using hard binder.

For example, JP-A-3-88119, JP-A-3-83221, or JP-A-3-216812 disclose as follows: In a magnetic recording medium having an upper magnetic layer and a lower coating layer, a polyester polyurethane resin is used as a binder, and a substance having glass transition temperature (Tg) of 40° C. to 100° C. or a substance having high dynamic strength such as aromatic polyurethane is used as a binder for the upper magnetic layer. More concretely, a substance such as polyester urethane is described. These substances having aromatic compounds have problems in that they cause the decrease of solubility in a solvent and reduces dispersion property. It is described that a substance having Tg of −10° C. to −50° C. or aliphatic polyurethane such as polyester, polyether, etc. can be used as the material for the lower layer, but these have very low dynamic strength and are insufficient in ability to adsorb to powder. As a result, these are not satisfactory in dispersion property. Also, these substances are disadvantageous in that the lower layer polyurethane tends to deposit on the surface of coating film in coating film drying process and that dynamic strength of coating film surface is low and durability is not satisfactory.

As the material for the lower layer, JP-A-7-176042 discloses the use of polyurethane, which has such structure that 1 to 2 mols of propylene oxide (PO) are added to bisphenol A, but this is unsatisfactory in ability to adsorb to powder and also in dispersion property. If PO-added structure is increased in bisphenol A in order to improve adsorbing ability, the quantity adsorbed to powder is increased, while solubility in a solvent is decreased because bisphenol A skeletons having aromatic compound increase. JP-A-1-268729 discloses in the example the use of polypropylene oxide (PPO) added to bisphenol A as a polyether urethane having cyclic structure for a single layer magnetic layer, while PPO component shows low dynamic strength of coating film and it is not satisfactory in durability.

Further, JP-A-7-50010 discloses a magnetic recording medium using a polyurethane, which contains a long-chain diol by 0 to 5 mol %. However, coating film is too hard because it mostly consists of hard segments and has low moldability in calender process. Further, the coating film is not sufficiently smooth and electromagnetic transfer characteristics are also not satisfactory.

As described above, conventional type polyurethane resin or polyurethane urea resin used as a binder for the magnetic recording medium are not very satisfactory in terms of durability.

To solve the above problems, it is an object of the present invention to provide a magnetic recording medium, which has high calender moldability, provides very smooth coating film surface and shows good electromagnetic transfer characteristics, and further has coating film surface of high dynamic strength and good running durability.

SUMMARY OF THE INVENTION

To attain the above object, the magnetic recording medium according to the present invention comprises a lower layer and a magnetic layer, said lower layer having at least one of magnetic powder or non-magnetic inorganic powder and a binder (A) dispersed therein and being placed on a non-magnetic support member, at least one layer of said magnetic layers having ferromagnetic powder and a binder (B) dispersed therein and being deposited on said lower layer, whereby said magnetic recording medium comprises polyurethane resins (1) and (2), said polyurethane resin (1) is contained as said binder (B) and comprises a short-chain diol having a cyclic structure and weight average molecular weight of 200 to 500 in an amount of 15 to 50 weight %, a polyol having an ether group of 1 to 6 mmol/g and weight average molecular weight of 500 to 5000 in an amount of 10 to 50 weight % in polyurethane, and an organic diisocyanate, and said polyurethane resin (2) is contained as said binder (A) and comprises a short-chain diol having cyclic structure and weight average molecular weight of 200 to 500 in an amount of 0 to 15 weight %, a polyol having an ether group of 6 to 14 mmol/g and weight average molecular weight of 500 to 5000 in an amount of 50 to 90 weight %, and an organic diisocyanate.

The invention also provides a magnetic recording medium as described above, wherein the short-chain diol with cyclic structure contained in at least one of said polyurethane resin (1) or said polyurethane resin (2) contains at least one compound selected from the following groups:

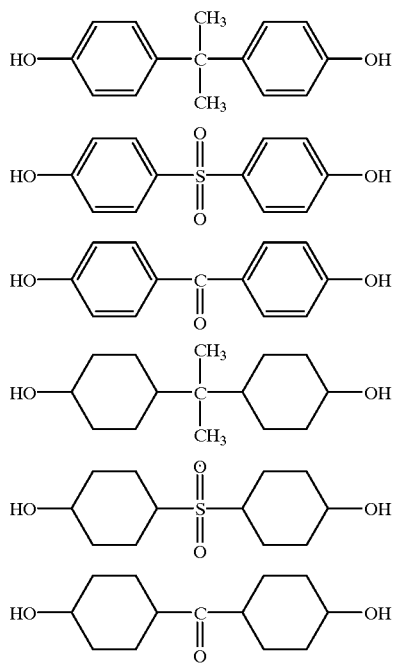

Further, the present invention provides a magnetic recording medium as described above, wherein at least one of said polyurethane resin (1) or said polyurethane resin (2) contains a polyol given by the following formula as a polyol having ether group:

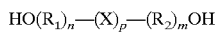

where the symbol X represents one of the following groups:

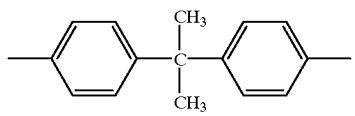

-continued

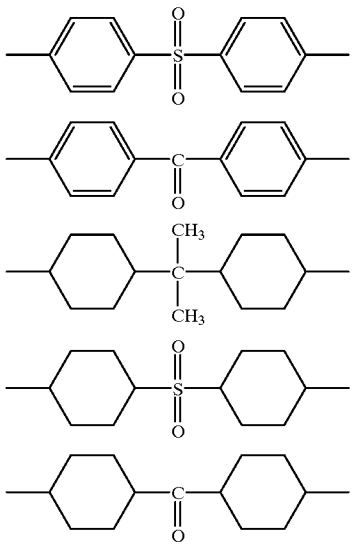

and $R_1$ represents:

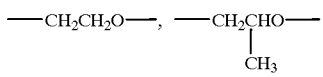

and $R_2$ represents:

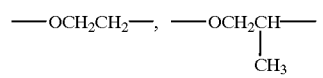

In the above formula, the symbols n and m each represents an integer of 4 to 40, and p represents an integer of 0 to 1.

The present invention also provides the magnetic recording medium as described above, wherein thickness of said upper layer is not more than 0.5 μm and thickness of said lower layer is not less than 1 μm.

DESCRIPTION OF THE PREFERRED EMBODIMENTS

In the magnetic recording medium of the present invention, a polyurethane resin having a short-chain diol with cyclic structure and a short-chain diol containing ether bond is used as the upper magnetic layer, and a polyurethane resin having no cyclic structure or a slight cyclic structure and having a short-chain diol containing ether bond is used as the lower coating layer. As a result, the lower coating layer has flexibility, and the lower layer has better calender moldability, while the upper layer has very good durability and good surface property, and this makes it possible to improve durability and electromagnetic transfer characteristics.

In the magnetic recording medium of the present invention, the polyurethane resin (1) used for the upper magnetic layer preferably contains a short-chain diol with cyclic structure by 20 to 40 weight %. If it contains the short-chain diol by less than 20 weight %, dynamic strength decreases and durability also decreases. On the other hand, if it contains the short-chain diol by more than 40 weight %, solubility in solvent decreases, and this leads to lower dispersion property. The coated film thus formed becomes fragile and durability also decreases.

More concretely, as the short-chain diol having cyclic structure, compound such as bisphenol A, hydrogenated bisphenol A, bisphenol S. bisphenol P or ethylene oxide, propylene oxide, or mixed added product of ethylene oxide or propylene oxide of these compounds may be used. More preferably, compound such as hydrogenated bisphenol A or ethylene oxide or propylene oxide added products of these compounds may be used.

The polyol having ether group is preferably contained in an amount of 10 to 50 weight %, or more preferably in an amount of 15 to 45 weight %, or most preferably in an amount of 18 to 40 weight % If it is contained in an mount of less than 10 weight %, solubility in solvent decreases, and dispersion property also decreases. If it is contained in an amount of more than 50 weight %, strength of coating film decreases, and this results in lower durability.

As the polyol containing ether group, a compound given by the following formula may be used:

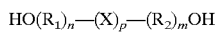

where X represents a group selected from the following groups:

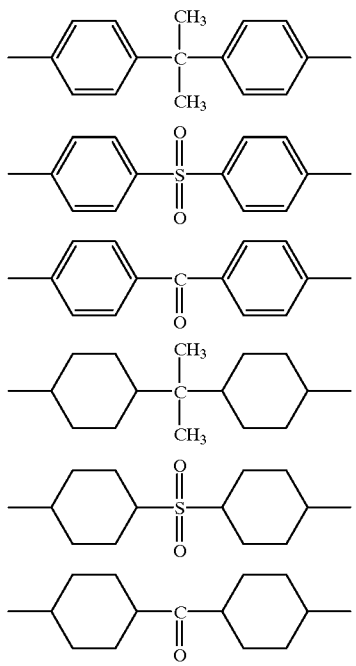

and $R_1$ represents:

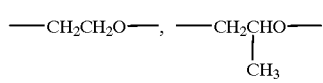

and $R_2$ represents:

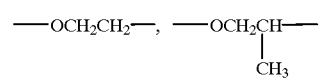

In the above formula, n and m each represents an integer of 4 to 40, and p represents an integer of 0 to 1.

Of these, the compound to be used has skeleton of bisphenol A, hydrogenated bisphenol A or ethylene oxide or propylene oxide added product.

As molecular weight of the polyurethane, weight average molecular weight (Mw) of 30,000 to 70,000 is preferable, or more preferably 40,000 to 60,000. If it is less than 30,000, coating film strength decreases, and this means lower durability. If it is more than 70,000, solubility in solvent decreases, leading to lower dispersion property, and this is not desirable.

The content of OH in the polyurethane is preferably 2 to 20 per molecule, or more preferably 3 to 15 per molecule.

If the content of OH is less than 3 per molecule, reactivity with isocyanate hardening agent decreases. This results in lower coating film strength and lower durability. On the other hand, if it is more than 15 per molecule, solubility in solvent decreases, and this results in lower dispersion property.

The glass transition temperature (Tg) of the polyurethane is preferably 60° C. to 160° C., or more preferably 80° C. to 130° C., or most preferably 100° C. to 120° C.

If it is lower than 60° C., coating film strength decreases at high temperature, and this results in lower durability and poor storage property. If it is higher than 160° C., calender moldability decreases, and this results in lower electromagnetic transfer characteristics.

As a polar group in the polyurethane resin, a group such as $-SO_3M$, $-OSO_3M$, $-PO_3M_2$, or $-COOM$ may be used (where M represents hydrogen, alkali metal, alkali earth metal or ammonium salt), or more preferably $-SO_3M$ or $-OSO_3M$.

The content of the polar group is preferably $1 \times 10^{-5}$ eq/g to $2 \times 10^{-4}$ eq/g to the weight of the binder. If it is less than $1 \times 10^{-5}$ eq/g, adsorption to the magnetic material is not satisfactory and this results in lower dispersion property. If it is more than $2 \times 10^{-4}$ eq/g, solubility in solvent decreases, and this leads to lower dispersion property.

The polyurethane resin (2) for the lower layer preferably contains a short-chain diol with cyclic structure by 5 to 10 weight %. If it is contained by less than 5 weight %, dynamic strength decreases, and this results in lower durability. on the other hand, if it is contained by more than 10 weight %, solubility in solvent decreases. This leads lower dispersion property. Further, coating film becomes fragile and durability also decreases.

As the short-chain diol having cyclic structure, compound such as bisphenol A, hydrogenated bisphenol A, bisphenol S, bisphenol P or ethylene oxide, propylene oxide, or mixed added product of ethylene oxide or propylene oxide of these compounds may be used. More preferably, compound such as hydrogenated bisphenol A or ethylene oxide or propylene oxide added products of these compounds may be used.

The polyol having ether group is preferably contained in an amount of 50 to 90 weight %, or more preferably in an amount of 55 to 85 weight %, or most preferably in an amount of 60 to 70 weight %. If it is contained in an amount of less than 50 weight %, solubility in solvent decreases, and this leads to lower dispersion property. If it is contained in an amount of more than 90 weight %, coating film strength decreases, and this results in lower durability.

As the polyol containing ether group, a compound given by the following formula may be used:

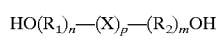

where X represents a group selected from the following groups:

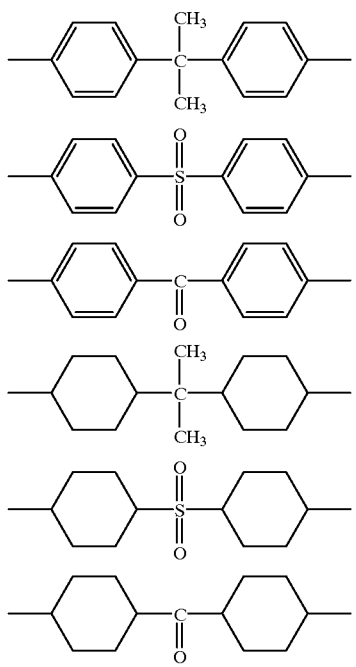

and $R_1$ represents:

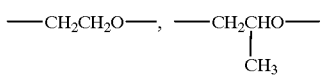

and $R_2$ represents:

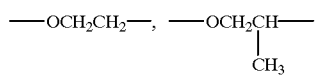

In the above formula, n and m each represents an integer of 4 to 40, and p represents an integer of 0 to 1.

Of these, the compound to be used has skeleton of bisphenol A, hydrogenated bisphenol A or ethylene oxide or propylene oxide added product.

As molecular weight of the polyurethane, weight average molecular weight (Mw) of 20,000 to 100,000 is preferable, or more preferably 40,000 to 60,000. If it is less than 20,000, coating film strength decreases, and this means lower durability. If it is more than 100,000, solubility in solvent decreases, leading to lower dispersion property, and this is not desirable.

The content of OH in the polyurethane is preferably 2 to 20 per molecule, or more preferably 3 to 15 per molecule.

If the content of OH is less than 3 per molecule, reactivity with isocyanate hardening agent decreases. This results in lower coating film strength and lower durability. On the other hand, if it is more than 15 per molecule, solubility in solvent decreases, and this results in lower dispersion property.

The glass transition temperature (Tg) of the polyurethane is preferably −10° C. to 30° C., or more preferably 0° C. to 20° C.

If it is lower than −10° C., coating film strength decreases at high temperature, and this results in lower durability and poor storage property. If it is higher than 30° C., calender moldability decreases, and this results in lower electromagnetic transfer characteristics.

As a polar group in the polyurethane resin, a group such as —$SO_3M$, —$OSO_3M$, —$PO_3M_2$, or —COOM may be used (where M represents hydrogen, alkali metal, alkali earth metal or ammonium salt), or more preferably —$SO_3M$ or —$OSO_3M$.

The content of the polar group is preferably $1\times10^{-5}$ eq/g to $2\times10^{-4}$ eq/g to the weight of the binder. If it is less than $1\times10^{-5}$ eq/g, adsorption to the magnetic material is not satisfactory and this results in lower dispersion property. If it is more than $2\times10^{-4}$ eq/g, solubility in solvent decreases, and this leads to lower dispersion property.

The binder of the present invention may contain organic diisocyanate. As the organic diisocyanate compound, the following substances may be used: aromatic diisocyanate such as 2,4-tolylene diisocyanate, 2,6-tolylene diisocyanate, xylene-1,4-diisocyanate, xylene-1,3-diisocyanate, 4-4'-diphenylmethane diisocyanate, 4,4-diphenylether diisocyanate, 2-nitrodiphenyl-4,4'-diisocyanate, 2,2'-diphenylpropane-4,4'-diisocyanate, p-phenylene diisocyanate, naphthylene-1,4-diisocyanate, naphthylene-1,5-diisocyanate, 3,3'-dimethoxyphenyl-4,4'-diisocyanate, aliphatic diisocyanate such as lysine diisocyanate, or cycloaliphatic diisocyanate such as isophorone diisocyanate, hydrogenated tolylene diisocyanate, hydrogenated diphenylmethane diisocyanate, etc.

In case hardening is performed using electron beam irradiation, a compound having reactive double bond such as urethane acrylate may be used.

Total weight of resin components and hardening agent (i.e. binder) is preferably within the range of 15 to 40 weight parts to 100 weight parts of the ferromagnetic powder, or more preferably 20 to 30 weight parts.

As the ferromagnetic powder in the magnetic recording medium of the present invention, powder of ferromagnetic iron oxide, cobalt-containing ferromagnetic iron oxide or ferromagnetic alloy may be used, and it has preferably specific surface area of 40 to 80 $m^2/g$, or more preferably 50 to 70 $m^2/g$. Crystallite size is preferably 12 to 25 nm, or more preferably 13 to 22 nm, or most preferably 14 to 20 nm. Length of the longer axis is preferably 0.05 to 0.25 μm, or more preferably 0.07 to 0.2 μm, or most preferably 0.08 to 0.15 μm. As the ferromagnetic powder, powder of Fe, Ni, Fe—Co, Fe—Ni, Co—Ni, Co—Ni—Fe, etc. may be used. Also, an alloy containing the following element within the range of less than 20 weight % of the metal components may be used: aluminum, silicon, sulfur, scandium, titanium, vanadium, chromium, manganese, copper, zinc, yttrium, molybdenum, rhodium, palladium, gold, tin, antimony, boron, barium, tantalum, tungsten, rhenium, silver, mercury, lead, phosphorus, lanthanum, cerium, praseodymium, neodymium, tellurium, or bismuth. The ferromagnetic metal powder may contain small quantity of water, hydroxide or oxide. The method to produce the ferromagnetic powder as given above is already known in the art, and the ferromagnetic powder used in the present invention can be produced according to the method already known.

There is no special restriction to the shape of the ferromagnetic powder. Usually, the powder in needle-like shape, granular shape, cubic shape, grain-like shape or planar shape may be used. In particular, it is preferable to use the ferromagnetic powder of needle-like shape.

The resin components, the hardening agent and the ferromagnetic powder as described above are kneaded and dispersed together with a solvent such as methylethylketone, dioxane, cyclohexanone, ethyl acetate, etc. to prepare magnetic coating material. Kneading and dispersing can be performed according to the procedure already known.

In addition to the above components, the magnetic coating material may contain abrasive material such as $\alpha$-$Al_2O_3$, $Cr_2O_3$, etc., anti-static agent such as carbon black, lubricant such as fatty acid, fatty acid ester, silicone oil, etc., or additive or filling material normally used as dispersant may be contained.

Next, description will be given on the lower non-magnetic layer or the lower magnetic layer in case the magnetic medium of the present invention has multi-layer structure. Inorganic powder used in the lower layer of the present invention may be magnetic powder or non-magnetic powder. For example, the non-magnetic powder can be selected from inorganic compounds such as metal oxide, metal carbonate, metal sulfate, metal nitride, metal carbide, metal sulfide, etc. As the inorganic compounds, the following substances may be used alone or in combination: $\alpha$-alumina having alpha ratio of 90 to 100%, $\beta$-alumina, $\gamma$-alumina, silicon carbide, chromium oxide, cerium oxide, $\alpha$-iron oxide, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, molybdenum disulfide, etc. In particular, it is preferable to use titanium dioxide, zinc oxide, iron oxide, or barium sulfate, or more preferably titanium dioxide. The non-magnetic powder has preferably average particle size of 0.005 to 2 $\mu$m. When necessary, non-magnetic powder having different average particle sizes may be combined together, or a single type of non-magnetic powder having wider particle size distribution may provide the same effect. In particular, the non-magnetic powder has preferably average particle size of 0.01 to 0.2 $\mu$m. It is preferable that pH value of the non-magnetic powder is between 6 and 9. Specific surface area of the non-magnetic powder is preferably 1 to 100 $m^2/g$, or more preferably 5 to 50 $m^2/g$, or most preferably 7 to 40 $m^2/g$. Crystallite size of the non-magnetic powder is preferably 0.01 to 2 $\mu$m. Oil absorption using DBP is preferably 5 to 100 ml/100 g, or more preferably 10 to 80 ml/100 g, or most preferably 20 to 60 ml/100 g. Specific gravity is preferably 1 to 12, or more preferably 3 to 6. The shape of the powder may be any of needle-like shape, spherical shape, polyhedron shape or planar shape.

On the surface of the non-magnetic powder as described above, it is preferable to perform surface treatment using $Al_2O_3$, $SiO_2$, $TiO_2$, $ZrO_2$, $SnO_2$, $Sb_2O_3$, or ZnO. In particular, $Al_2O_3$, $SiO_2$, $TiO_2$ or $ZrO_2$ is preferably used to have better dispersion property, or more preferably $Al_2O_3$, $SiO_2$, or $ZrO_2$. These may be used in combination or alone. Depending on the purpose, co-precipitated surface treatment layer may be used, and a method to process with alumina at first and then to process the surface with silica may be used, or this procedure may be performed in reverse sequence. The surface treatment layer may be porous depending upon the purpose, while it is generally preferable that it is homogeneous and dense.

It is possible to decrease Rs, i.e. the effect already known, by mixing carbon black in the lower layer, and the desired micro-Vickers hardness can be obtained. For this purpose, furnace black for rubber, thermal black for rubber, carbon black for color, acetylene black, etc. may be used.

Specific surface area of the carbon black is preferably 100 to 500 $m^2/g$, or more preferably 150 to 400 $m^2/g$. DBP oil absorption is preferably 20 to 400 ml/100 g, -or more preferably 30 to 200 ml/100 g. Average particle size of carbon black is preferably 5 to 80 nm, or more preferably 10 to 50 nm, or most preferably 10 to 40 nm. It is preferable that pH value of carbon black is 2 to 10, moisture content is 0.1 to 10%, and tap density is 0.1 to 1 g/ml. As the carbon black used in the present invention, the following products may be used: Blackpearls 2000, 1300, 1000, 900, 800, 880 or 700, Vulcan XC-72 (manufactured by Cabot), #3050B, #3150B, #3250B, #3750B, #3950B, #950, #650B, #970B, #850B, or MA-600 (manufactured by Mitsubishi Chemical), Conductex SC, Raven 8800, 8000, 7000, 5750, 5250, 3500, 2100, 2000, 1800, 1500, 1255, 1250 (manufactured by Columbia Carbon Co.), Ketchen Black EC (manufactured by Akzo Inc.).

In the lower layer of the product of the present invention, magnetic powder may be used. As the magnetic powder, an alloy containing $\gamma$-$Fe_2O_3$, Co-modified $\gamma$-$Fe_2O_3$ or $\alpha$-Fe as major component, or $CrO_2$, etc. may be used. In particular, it is preferable to use Co-modified $\gamma$-$Fe_2O_3$. The ferromagnetic powder used in the lower layer of the medium of the present invention has preferably the same composition and the same performance characteristics as the ferromagnetic powder used in the upper magnetic layer. However, the performance characteristics may be changed in the upper and the lower layers depending upon the purpose. For example, to improve the recording property for signals of long wavelength, it is desirable to set the value Hc of the lower magnetic layer to a value lower than that of the upper magnetic layer. Also, it is effective to set the value of Br of the lower magnetic layer to a value higher than that of the upper magnetic layer. In addition, multi-layer structure as already known may be adopted to provide more advantages.

As the binder, lubricant, dispersant, additive, or solvent or dispersion procedure of the lower magnetic layer or the lower non-magnetic layer, those of the magnetic layer may be applied. in particular, the technique already known for the magnetic layer may be applied with respect to quantity and type of binder, adding quantity and type of additive or dispersant.

The magnetic coating material prepared using the above materials is coated on the non-magnetic support member, and a magnetic layer is formed.

As the non-magnetic support member used in the present invention, the following substances processed by biaxial stretching may be used: polyethylene naphthalate, polyethylene terephthalate, polyamide, polyimide, polyamideimide, aromatic polyamide, polybenzoxydazol, etc. may be used. More preferably, polyethylene naphthalate or aromatic polyamide is used. The non-magnetic support member may be processed in advance by corona discharge, plasma treatment, adhesive treatment, heat treatment, etc. The non-magnetic support member used in the present invention has preferably such surface smoothness that average surface roughness in center line is within the range of 0.1 to 20 nm with cutoff value of 0.25 nm, or more preferably within the range of 1 to 10 nm. Also, it is preferable that the non-magnetic support member has not only lower average surface roughness in center line but also it does not have coarse protrusion of more than 1 $\mu$m.

To produce the magnetic recording medium of the present invention, the magnetic layer coating solution is coated on the surface of the non-magnetic support member under running condition to have layer thickness within 0.05 to 3.0 $\mu$m after drying of the magnetic layer, or more preferably 0.07 to 1.0 $\mu$m. Two or more types of the magnetic coating materials may be coated sequentially or at the same time.

As the coating device for coating the above magnetic coating material, the following devices may be used: air doctor coat, blade coat, rod coat, extrusion coat, air knife coat, squeeze coat, immersion coat, reverse roll coat, transfer roll coat, gravure coat, kiss coat, cast coat, spray coat, spin coat, etc.

For further details of these devices, reference should be made, for example, to "The Newest Coating Technique" published by Sogo Gijutsu Center, Ltd. (May 31, 1983).

In case the product according to the present invention is applied to a magnetic recording medium with two or more layers, it is proposed to use the following devices and methods:

(1) Using a coating device of such type as gravure, roll, blade, extrusion, etc. generally applied for the coating of the magnetic coating material, the lower layer is coated at first, and while the lower layer is not yet dried, the upper layer is coated using a support member pressurized type extrusion coating device as disclosed in JP-B-1-46186, JP-A-60-238179, JP-A-2-265672, etc.

(2) The upper and the lower layers are coated almost at the same time using a coating head, which has two slits to pass the coating solution as disclosed in JP-A-63-88080, JP-A-2-17971, or JP-A-2-265672.

(3) The upper and the lower layers are coated almost at the same time using an extrusion coating device with backup roll as disclosed in JP-A-2-174965.

On the surface of the non-magnetic support member of the present invention where the magnetic coating material is not coated, a back-coat layer (a backing layer) may be provided. The back-coat layer is a layer where a coating material for forming the back-coat layer is coated on the surface of the non-magnetic support member where magnetic coating material is not coated. This coating material is obtained by dispersing granular components such as abrasive material, anti-static agent, etc. together with a binder in an organic solvent. As the granular component, various types of inorganic pigments or carbon black may be used. As the binder, nitrocellulose, or resins such as phenoxy resin, vinyl chloride resin, polyurethane, etc. may be used alone or by mixing together.

An adhesive layer may be provided on the surface of the non-magnetic support member where the magnetic coating material and the coating material for forming back-coat layer are coated.

The layer coated with the magnetic coating material is dried after magnetic field orientation processing is performed to orient the ferromagnetic powder contained in the coating layer of the coating material.

After drying as described above, surface smoothening is performed on the coated layer. For the surface smoothening, a super-calender roll may be used, for example. By the surface smoothening, pores generated due to removal of solvent during drying are eliminated, and filling ratio of the ferromagnetic powder in the magnetic layer is increased. This makes it possible to obtain a magnetic recording medium having high electromagnetic transfer characteristics.

As the calender processing roll, a heat-resistant plastic roll made of epoxy, polyimide, polyamide, polyamideimide, etc. may be used. Also, a metal roll may be used.

The magnetic recording medium of the present invention referably has such smoothness that average surface roughness in center line is 0.1 to 4 nm, or more preferably 0.5 to 2.5 nm with cutoff value of 0.25 nm.

This can be performed by calender processing as described above on the magnetic layer, which is formed by selecting a specific type of ferromagnetic powder and a binder as described above. In the calender processing conditions, temperature of calender roll is preferably in the range of 60° C. to 100° C., or more preferably in the range of 70° C. to 100° C., or most preferably 80° C. to 100° C. The pressure is preferably within the range of 100 to 500 kg/cm, or more preferably 200 to 450 kg/cm, or most preferably 300 to 400 kg/cm.

A laminated product prepared by the hardening as described above is cut off to the desired shape. Cutting can be performed using an ordinary type cutter such as slitter.

In the magnetic recording medium of the present invention, the polyurethane resin of the upper magnetic layer contains more quantity of short-chain diol with cyclic structure than the polyurethane of known type. As a result, it has more hard segments with cyclic structure, and this makes it possible to provide a product with higher strength and higher Tg value. In particular, the product of the present invention exhibits superb performance in repeated running under high temperature environment. Because the polyurethane contains ether group by 1 to 6 mmol/g, adsorption property to magnetic substance is increased, and solubility in solvent is also improved. As a result, the product has higher electromagnetic transfer characteristics.

Further, a specific type of polyurethane resin (2) is used in the lower layer, and this makes it possible to improve dispersion property of the lower layer powder and to more easily mold the coating film in the calender process. As a result, it is possible to provide smooth coating film surface, and electromagnetic transfer characteristics can be extensively improved. This is attributable to the fact that the components such as polypropylene oxide or polyethylene oxide to introduce ether groups soften the lower layer coating film and this makes the lower layer coating film more fluidized and more easily moldable when it is molded by calender roll. Because it contains ether groups, it is more easily adsorbed to powder in the lower layer coating film. This may improve dispersion property of the powder in the lower layer coating film. Because the lower layer is smoothened, the upper layer is also smoothened, and electromagnetic transfer characteristics may be improved. When adsorption to the lower layer powder is improved, it is possible to provide the effect to prevent the lower layer binder from being moved toward the upper layer as the solvent is evaporated in the drying process. It appears that the durability in repeated running can be improved because the strength of the coating film surface is not decreased.

In the following, description will be given on the features of the present invention referring to embodiments of the invention:

EMBODIMENTS

Hereinafter, the term "part(s)" indicates "weight part(s)", and the symbol "%" means "weight %".

Synthesis Example 1

(Synthesis example of polyurethane resin)

In a container, which is equipped with a reflux condenser and a stirrer and in which internal air has been replaced with nitrogen in advance, a short-chain diol, a polyol and a compound A as shown in Table 1 were dissolved at 60° C. in cyclohexanone under nitrogen stream. Next, di-n-dibutyl tin dilaurate (60 ppm) was added as a catalyzer and this was dissolved for 15 minutes. Further, a compound B as shown in Table 1 was added, and heat reaction was performed at 90° C. for 6 hours, and a polyurethane resin solution was obtained.

Material composition and physical property of the polyurethane resin thus prepared are summarized in Table 1.

TABLE 1

| Polyurethane No. | Short-chain diol with cyclic structure (wt %) | Ether-containing polyol (wt %) | Other compounds (wt %) | | Compound A (wt %) | Compound B (wt %) | Ether group content (mmol/g) | Weight average molecular weight | Glass transition temperature (Tg) (° C.) |
|---|---|---|---|---|---|---|---|---|---|
| 1-1 | HBpA 15 | BpAPO500 45 | | | 2 | 38 | 4 | 42000 | 65 |
| 1-2 | ↓ 40 | BpAPO600 10 | | | 2 | 48 | 1 | 38500 | 160 |
| 1-3 | ↓ 15 | ↓ 10 | PCL1000 | 40 | 2 | 33 | 1 | 41200 | 60 |
| 1-4 | ↓ 23 | BpAPO1000 40 | | | 2 | 35 | 5 | 43200 | 90 |
| 1-5 | ↓ 12 | BpAPO500 55 | | | 2 | 31 | 6 | 42100 | 50 |
| 1-6 | ↓ 30 | BpAPO900 43 | | | 2 | 25 | 7 | 40500 | 40 |
| 1-7 | ↓ 45 | BpAPO3000 7 | | | 2 | 46 | 1 | 40500 | 180 |
| 1-8 | ↓ 12 | BpAPO500 10 | PCL500 | 40 | 2 | 36 | 1 | 42300 | 50 |
| 2-1 | ↓ 0 | BpAPO2000 85 | | | 2 | 13 | 13 | 39600 | −10 |
| 2-2 | ↓ 15 | BpAPO600 53 | | | 2 | 30 | 6 | 43200 | 30 |
| 2-3 | ↓ 0 | BPAPO1000 78 | | | 2 | 20 | 10 | 41500 | 15 |
| 2-4 | ↓ 15 | BpAPO3000 65 | | | 2 | 18 | 10 | 40500 | 30 |
| 2-5 | ↓ 20 | BpAPO1000 50 | | | 2 | 28 | 7 | 39600 | 35 |
| 2-6 | ↓ 15 | BpAPO500 50 | PCL500 | 5 | 2 | 28 | 5 | 42100 | 33 |
| 2-7 | ↓ 0 | BpAPO3000 92 | | | 2 | 6 | 15 | 42000 | −20 |
| 2-8 | ↓ 0 | BpAPO3000 35 | PCL3000 | 57 | 2 | 6 | 6 | 43000 | −15 |

Diol and polyol shown in Table 1 are as follows:

BpAPPO500: Polypropylene oxide added product of bisphenol A (molecular weight: 500)

BpAPPO600: Polypropylene oxide added product of bisphenol A (molecular weight: 600)

BpAPPO900: Polypropylene oxide added product of bisphenol A (molecular weight: 900)

BpAPPO1000: Polypropylene oxide added product of bisphenol A (molecular weight: 1000)

BpAPPO2000: Polypropylene oxide added product of bisphenol A (molecular weight: 2000)

BpAPPO3000: Polypropylene oxide added product of bisphenol A (molecular weight: 3000)

BpAPPO5000: Polypropylene oxide added product of bisphenol A (molecular weight: 5000)

PCL500: Polycaprolactone polyol (molecular weight 500)

PCL1000: Polycaprolactone polyol (molecular weight 1000)

PCL3000: Polycaprolactone polyol (molecular weight 3000)

Compound A: Ethylene oxide added product of sulfoisophthalic acid

Compound B: MDI (4,4-diphenylmethane diisocyanate)

Example 1

In an open kneader, 100 parts of ferromagnetic alloy powder (composition: Fe 92%, Zn 4%, Ni 4%; Hc 2000oe; crystallite size 15 nm; BET specific surface area 59 m$^2$/g; longer axis diameter 0.12 μm; acicular ratio 7; σs 140 emu/g) were pulverized for 10 minutes. Next, 7.5 parts of a compound, which was obtained by adding hydroxyethyl sulfonate sodium salt to copolymer of vinyl chloride/vinyl acetate/glycidyl methacrylate (86:9:5) (SO$_3$Na=6×10$^{-5}$ eq/g; epoxy=10$^{-3}$ eq/g; Mw 30,000), 10 parts of polyurethane 1-1 (solid), and 60 parts of cyclohexanone were kneaded for 60 minutes. Then, the following substances were added:

| | |
|---|---|
| Abrasive (Al$_2$O$_3$; particle size 0.3 μm) | 2 parts |
| Carbon black (particle size 40 nm) | 2 parts |
| Methylethylketone/toluene (1/1) | 200 parts |

The mixture was then dispersed in a sand mill for 120 minutes. Then, the following substances were added:

| | |
|---|---|
| Polyisocyanate (Coronate 3041; Nippon Polyurethane Co.) | 5 parts (solid) |
| Butyl stearate | 2 parts |
| Stearic acid | 1 part |
| Methylethylketone | 50 parts |

This was further stirred and mixed for 20 minutes and was then filtered through a filter having average pore size of 1 μm, and a magnetic coating material for the upper layer was prepared.

Next, 85 parts of titanium oxide (average particle size 0.035 μm; crystal form rutile; TiO$_2$ content 90% or more; Surface treatment layer: alumina; $S_{BET}$ 35 to 42 m$^2$/g; true specific gravity 4.1; pH 6.5 to 8.0) were pulverized in an open kneader for 10 minutes. Next, 7.5 parts of a compound, which was obtained by adding hydroxyethyl sulfonate sodium salt to copolymer of vinyl chloride/vinyl acetate/glycidyl methacrylate (86:9:5) (SO$_3$Na=6×10$^{-5}$ eq/g; epoxy=10$^{-3}$ eq/g; Mw 30,000), 10 parts of polyurethane 2-1 (solid), and 60 parts of cyclohexanone were kneaded for 60 minutes.
Then,

| | |
|---|---|
| Methylethylketone/cyclohexanone (6/4) | 200 parts | were added, and the mixture was dispersed in a sand mill for 120 minutes.

Further, the following substances were added:

| | |
|---|---|
| Butyl stearate | 2 parts |
| Stearic acid | 1 part |
| Methylethylketone | 50 parts |

This was further stirred and mixed for 20 minutes and was then filtered through a filter having average pore size of 1 μm, and a non-magnetic coating material for the lower layer was prepared.

Next, polyester resin containing sulfonic acid was coated on the surface of a polyethylene naphthalate support member of 10 μm in thickness using a coil bar so that the thickness after drying will be 0.1 μm, and an adhesive layer was formed.

The non-magnetic coating material for the lower layer was coated to have thickness of 2.0 μm, and immediately thereafter, the magnetic coating material for the upper layer was coated to have thickness of 0.1 μm using a reverse roll in simultaneous multiple layers. Using a magnet of 3000 gauss, magnetic field orientation was performed on the non-magnetic support member coated with the magnetic coating material while the magnetic coating material is not yet dried. After drying, calender processing was performed using a combination of metal roll—metal roll—metal roll—metal roll—metal roll—metal roll under the conditions of (speed 100 m/min., linear pressure 300 kg/cm; temperature 90° C.). Then, the product was cut off to have a width of 8 mm.

Next, the magnetic tape thus prepared was evaluated using the measuring method given below. The results are shown in Table 2.

Examples 2 to 7 and Comparative Examples 1 to 8

The products of Examples 2 to 7 and Comparative examples 1 to 5 were prepared by the same procedure as in Example 1 except that the polyurethane resin was replaced with the polyurethane resin shown in Table 2. The products were evaluated by the measuring method given below. The results are shown in Table 2.

Example 8

The magnetic coating material solution of Example 1 was used as the coating material for the upper magnetic layer. (Preparation of the non-magnetic coating material solution for the lower layer)

In an open kneader, 85 parts of α-Fe$_2$O$_3$ (average particle size 0.15 μm; S$_{BET}$ 52 m$^2$/g; Surface treatment Al$_2$O$_3$ and SiO$_2$; pH 6.5 to 8.0) were pulverized for 10 minutes. Next, 7.5 parts of a compound, which was obtained by adding hydroxyethyl sulfonate sodium salt to copolymer of vinyl chloride/vinyl acetate/glycidyl methacrylate (86:9:5) (SO$_3$Na=6×10$^{-5}$ eq/g; epoxy=10$^{-3}$ eq/g; Mw 30,000), 10 parts of polyurethane 2-1 (solid), and 60 parts of cyclohexanone were kneaded for 60 minutes.

Then,

| Methylethylketone/cyclohexanone (6/4) | 200 parts |
| --- | --- | were added, and the mixture was dispersed in a sand mill for 120 minutes.

Further, the following substances were added:

| Butyl stearate | 2 parts |
| --- | --- |
| Stearic acid | 1 part |
| Methylethylketone | 50 parts |

This was further stirred and mixed for 20 minutes and was then filtered through a filter having average pore size of 1 μm, and a non-magnetic coating material for the lower layer was prepared.

Next, polyester resin containing sulfonic acid was coated on the surface of a polyethylene naphthalate support member of 10 μm in thickness using a coil bar so that the thickness after drying will be 0.1 μm, and an adhesive layer was formed.

The non-magnetic coating material was coated to have thickness of 2.0 μm, and immediately thereafter, the magnetic coating material was coated to have thickness of 0.1 μm using a reverse roll in simultaneous multiple layers. Using a magnet of 3000 gauss, magnetic field orientation was performed on the non-magnetic support member coated with the magnetic coating material while the magnetic coating material is not yet dried. After drying, calender processing was performed using a combination of metal roll—metal roll—metal roll—metal roll—metal roll—metal roll—metal roll under the conditions of (speed 100 m/min., linear pressure 300 kg/cm; temperature 90° C.). Then, the product was cut off to have a width of 8 mm.

The magnetic tape prepared above was evaluated by the measuring method given below. The results are shown in Table 2.

Comparative Examples 6 and 7

A magnetic tape was prepared by the same procedure as in Example 8 except that the polyurethane shown in Table 2 was used.

The magnetic tape prepared above was evaluated by the measuring method given below. The results are shown in Table 2

[Measuring method]

(1) Electromagnetic transfer characteristics

On a specimen tape, a signal of 7 MHz was recorded using a video tape recorder (Sony Corporation; TR705) and the signal was reproduced. Relative reproducing output of the tape was measured using reproducing output of the signal of 7 MHz recorded on the standard tape (Comparative example 1) as 0 dB.

(2) Ra

By light interference method using a digital optical profimeter (manufactured by WYKO), average surface roughness on center line was expressed as Ra (in am) with the cutoff value of 0.25 mm.

(3) Roughness ratio at wavelength 30 to 40 nm

By MIRAU method using a digital optical profimeter (WYKO; TOPO3D), roughness ratio of an area (about 250 nm×250 nm) was measured. Relative roughness ratio (obtained by frequency analysis) was determined using the value of the Comparative example 1 as 100.

(4) Repeated running property

The video tape recorder used for the measurement of electromagnetic transfer characteristics was used. A magnetic tape of 60-minutes length was repeatedly and continuously run by 100 times under the conditions of 40° C. and 80% relative humidity. Then, contamination of video head was checked. Also, video output was continuously recorded, and output decrease was determined using the initial output as 0 dB.

Contamination of video head was assessed as follows:

No contamination was observed . . . Good

Contamination was found by visual inspection . . . No good (5) Hardness of coating film surface Under the conditions of 40° C. and 80% relative humidity, load was applied up to 0.2 g with load increment of 5 mg/sec. using a dynamic micro-hardness tester (Shimadzu; DUH-50). The value of hardness was obtained from indenter depth and indenter angle when the load of 0.2 g was applied.

(6) Dropout increase

Using the same video tape recorder as used for evaluation of electromagnetic transfer characteristics and under the condition of 23° C. and 10% relative humidity, the tape was run by 1000 passes with each pass being continued for 5 minutes. Then, number of dropouts, i.e. decrease of output by more than −10 dB, was determined for a period of 15 ms, and this was expressed as dropout increase.

(7) Edge crack

Edge portion of the tape was examined under differential interference light microscope (×500). When crack or flaw was found on edge portion of the tape per 1 meter, it was defined as "no good". If no crack or flaw was found, it was classified as "good".

from a polyol having an ether group of 6 to 14 mmol/g and weight average molecular weight of 500 to 5000 in an amount of 50 to 90 weight % of said resin (2), and an organic diisocyanate.

2. A magnetic recording medium according to claim 1, wherein the short-chain diol with cyclic structure units derved therefrom being contained in at least one of said polyurethane resin (1) or said polyurethane resin (2), comprises at least one compound selected from:

TABLE 2

| | Upper layer poly-urethane | Lower layer poly-urethane | Ra (nm) | Roughness ratio | Electromag. transfer charac. (dB) | Output decrease (dB) | Head contami-nation | Surface hardness | Number of dropouts | Edge cracks |
|---|---|---|---|---|---|---|---|---|---|---|
| Example 1 | 1-1 | 2-1 | 2 | 75 | 0.5 | −0.2 | Good | 54 | 20 | Good |
| Example 2 | 1-2 | 2-1 | 2.1 | 70 | 0.6 | 0 | Good | 56 | 25 | Good |
| Example 3 | 1-3 | 2-1 | 1.9 | 75 | 0.6 | −0.3 | Good | 55 | 30 | Good |
| Example 4 | 1-4 | 2-1 | 2.1 | 75 | 0.5 | −0.1 | Good | 61 | 31 | Good |
| Example 5 | 1-1 | 2-2 | 2.1 | 70 | 0.5 | 0 | Good | 60 | 28 | Good |
| Example 6 | 1-1 | 2-3 | 1.9 | 70 | 0.5 | −0.2 | Good | 54 | 26 | Good |
| Example 7 | 1-1 | 2-4 | 2.2 | 75 | 0.6 | −0.3 | Good | 56 | 30 | Good |
| Example 8 | 1-1 | 2-1 | 2.3 | 72 | 0.6 | −0.4 | Good | 55 | 84 | No good |
| Comparative example 1 | 1-5 | 2-1 | 2.8 | 97 | 0.1 | −0.8 | No good | 28 | 76 | No good |
| Comparative example 2 | 1-6 | 2-1 | 2.7 | 110 | −0.3 | −1.2 | No good | 36 | 80 | No good |
| Comparative example 3 | 1-7 | 2-1 | 3 | 110 | −0.4 | −1.1 | No good | 23 | 85 | No good |
| Comparative example 4 | 1-8 | 2-1 | 2.5 | 98 | −0.2 | −0.8 | No good | 24 | 80 | No good |
| Comparative example 5 | 1-1 | 2-5 | 3.5 | 105 | −0.4 | −1.4 | No good | 37 | 86 | No good |
| Comparative example 6 | 1-1 | 2-6 | 2.6 | 103 | −0.3 | −1.4 | No good | 30 | 92 | No good |
| Comparative example 7 | 1-1 | 2-7 | 2.8 | 100 | 0.1 | −0.9 | No good | 38 | 73 | No good |
| Comparative example 8 | 1-1 | 2-8 | 2.8 | 97 | 0.2 | −1.3 | No good | 29 | 75 | No good |
| Comparative example 9 | 1-5 | 2-1 | 2.9 | 98 | −0.1 | −0.8 | No good | 31 | 70 | No good |

Specific types of polyurethane resin were used for the upper magnetic layer and the lower coating layer respectively. As a result, dispersion property and calender moldability are improved, and the product shows better electromagnetic transfer characteristics. Strength of coating film surface is increased, and head contamination during repeated running operation is improved. As unexpected effects, tape edge cracks such as cracks, flaws, etc. on tape edge portion are eliminated. Dropout increase is reduced.

What we claim are:

1. A magnetic recording medium, comprising a non-magnetic support member, a lower layer and at least one magnetic layer in this order, said lower layer comprising at least one of magnetic or non-magnetic inorganic powder and a binder (A), said at least one magnetic layer comprising ferromagnetic powder and a binder (B), wherein said binder (B) is a polyurethane resin (1) and comprises units derived from a short-chain diol having a cyclic structure and weight average molecular weight of 200 to 500 in an amount of 15 to 50 weight % of said resin (1), units derived from a polyol having an ether group of 1 to 6 mmol/g and weight average molecular weight of 500 to 5000 in an amount of 10 to 50 weight % of said resin (1), and an organic diisocyanate, and said binder (A) is a polyurethane resin (2) and comprises units derived from a short-chain diol having cyclic structure and weight average molecular weight of 200 to 500 in an amount of 0 to 15 weight % of said resin (2), units derived

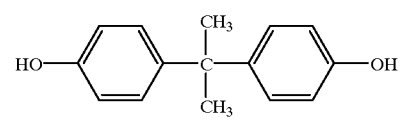

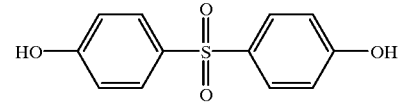

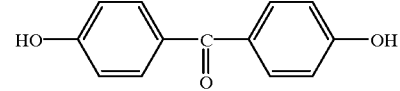

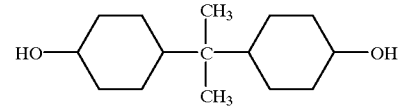

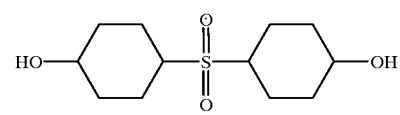

-continued

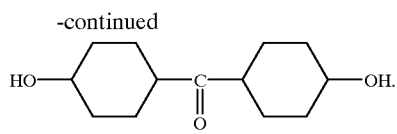

3. A magnetic recording medium according to claim 1, wherein at least one of said polyurethane resin (1) or said polyurethane resin (2) contains units derived from said polyol having an ether group represented by the following formula:

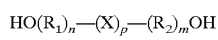

wherein X represents one of the following groups:

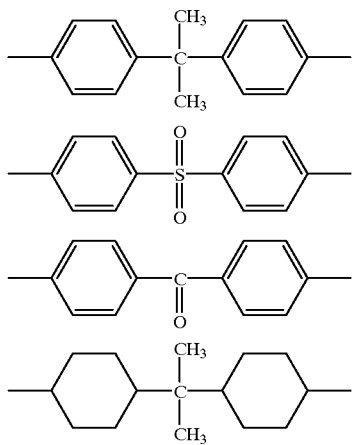

-continued

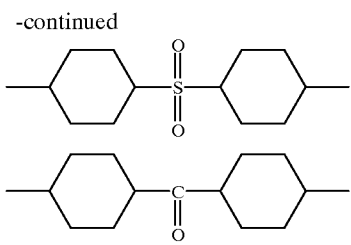

$R_1$ represents:

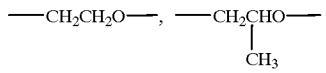

$R_2$ represents:

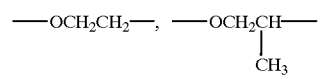

n and m each represents an integer of 4 to 40, and p represents an integer of 0 to 1.

4. A magnetic recording medium according to claim 1, wherein thickness of said magnetic layer is not more than 0.5 μm and thickness of said lower layer is not less than 1 μm.

* * * * *